United States Patent
Nakamura et al.

(10) Patent No.: US 8,976,560 B2
(45) Date of Patent: Mar. 10, 2015

(54) INVERTER CONTROL DEVICE AND INVERTER CONTROL METHOD

(75) Inventors: Toshiyuki Nakamura, Chigasaki (JP); Hiromichi Kawamura, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 180 days.

(21) Appl. No.: 13/816,377

(22) PCT Filed: Sep. 1, 2011

(86) PCT No.: PCT/JP2011/069913
§ 371 (c)(1),
(2), (4) Date: Feb. 11, 2013

(87) PCT Pub. No.: WO2012/039258
PCT Pub. Date: Mar. 29, 2012

(65) Prior Publication Data
US 2013/0141953 A1    Jun. 6, 2013

(30) Foreign Application Priority Data

Sep. 24, 2010  (JP) .................................. 2010-213311

(51) Int. Cl.
  *H02M 7/44* (2006.01)
  *H02M 7/42* (2006.01)
  *B60L 3/00* (2006.01)
  *B60L 11/18* (2006.01)
  *B60L 15/20* (2006.01)
  *H02P 21/00* (2006.01)

(52) U.S. Cl.
  CPC ............. *H02M 7/42* (2013.01); *B60L 3/0038* (2013.01); *B60L 11/1803* (2013.01); *B60L 15/20* (2013.01); *B60L 2240/421* (2013.01); *B60L 2240/423* (2013.01); *B60L 2240/527* (2013.01); *H02P 21/0035* (2013.01); *Y02T 10/643* (2013.01); *Y02T 10/7005* (2013.01)
  USPC ........................................ 363/97; 363/56.05

(58) Field of Classification Search
  USPC ............... 363/34–37, 95, 97, 98; 318/400.02, 318/400.03, 400.07, 400.22, 400.26, 803
  See application file for complete search history.

(56) References Cited

U.S. PATENT DOCUMENTS

2013/0106329 A1*  5/2013  Kato et al. ............... 318/400.11

FOREIGN PATENT DOCUMENTS

| JP | 2002-191198 A | 7/2002 |
| JP | 2005-117756 A | 4/2005 |
| JP | 2010-119228 A | 5/2010 |

* cited by examiner

*Primary Examiner* — Gary L Laxton
*Assistant Examiner* — Kyle J Moody
(74) *Attorney, Agent, or Firm* — Global IP Counselors, LLP

(57) ABSTRACT

An inverter control device includes a voltage detector, a target value calculation section, an inverter control section, an abnormality detector and a voltage clamp unit. The target value calculation section calculates a target value of an alternating current output from the inverter based on a detection voltage. The inverter control section controls a switching element of the inverter based on the detection voltage and the target value. The abnormality detector detects an abnormality in the voltage detector. The voltage clamp unit holds the detection voltage, for calculating the target value, at a first assured voltage determined based on a lower limit area of an assured voltage range that assures an operation of the inverter: and holds the detection voltage, for generating the control signal, at a second (higher) assured voltage, upon detecting the abnormality in the voltage detector.

3 Claims, 1 Drawing Sheet

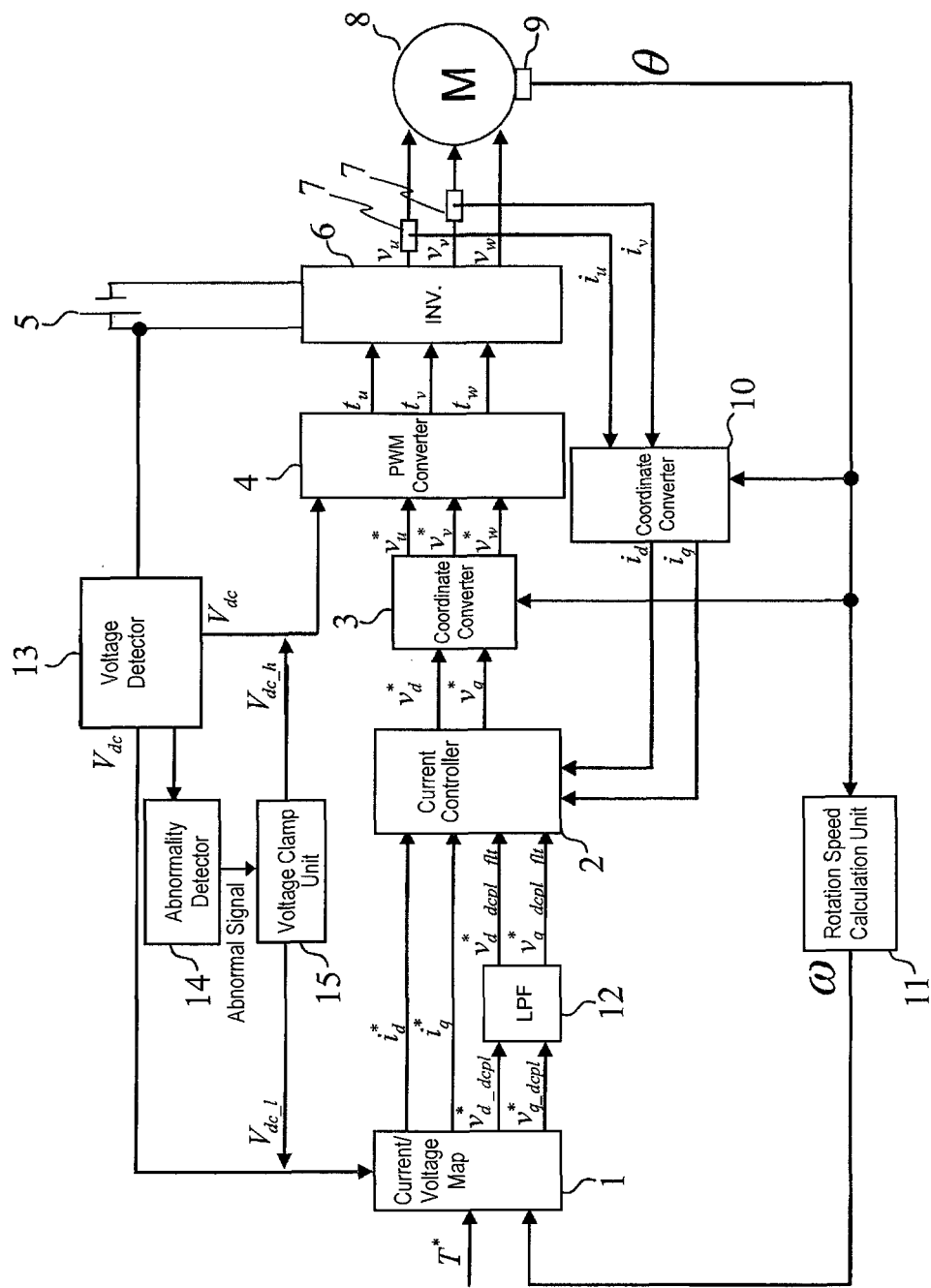

_US 8,976,560 B2_

INVERTER CONTROL DEVICE AND INVERTER CONTROL METHOD

CROSS-REFERENCE TO RELATED APPLICATIONS

This application is a U.S. National stage application of International Application No. PCT/JP2011/069913, filed Sep. 1, 2011, which claims priority claims priority to Japanese Patent Application No. 2010-213311, filed in Japan on Sep. 24, 2010, the entire contents of which is hereby incorporated by reference.

BACKGROUND

1. Field of the Invention

The present invention relates to an inverter control device and an inverter control method.

2. Background Information

A motor control system in prior art is comprised of a direct-current voltage detection means for detecting the direct-current voltage to drive a motor, a current detection means for detecting the current of the motor, a control means for carrying out a PWM control or a rectangular wave control of the motor based on the value of the direct-current voltage detected by the direct-current voltage detection means and the value of the current detected by the current detection means, and a failure detection device for detecting the occurrence of an abnormality in the direct-current voltage detection means; and this motor control system outputs the lowest value from among the values the inverter input voltage can be to the current command value generation part and the PWM signal generation part of the control means when an abnormality in the direct-current voltage detection means is detected by the failure detection device (Japanese Laid-Open Patent Application No. 2005-117756).

SUMMARY

There has been a problem of pulse width variation in the PWM signals being great and lacking control stability due to the reference voltage for determining the PWM signal being clamped at the lowest value when an abnormality in the direct-current voltage detection means is detected by the failure detection device.

The objective of the present invention is to provide an inverter control device and an inverter control method capable of stably controlling an inverter when an abnormality in the voltage detection means is detected.

The present invention achieves the aforementioned objective by clamping the voltage detected by the voltage detection means for generating a control signal for a switching element at the second assured voltage that is higher than the first assured voltage, which is determined based on the lower limit area of an assured voltage range that assures the performance of the inverter when an abnormality in the voltage detection means is detected by an abnormality detection means.

The present invention manifests the effects of suppressing the variation in the pulse width of a control signal and stably controlling the inverter by generating a control signal of a switching element based on the second assured voltage that is higher than the first assured voltage when an abnormality in the voltage detection means is detected.

BRIEF DESCRIPTION OF THE DRAWING

FIG. 1 is a block diagram of an inverter control device related to the first embodiment of the present invention.

DETAILED DESCRIPTION OF THE EMBODIMENTS

Below, an embodiment of the present invention will be explained based on the FIGURE.

First Embodiment

FIG. 1 is a block diagram of an inverter control device related to the first embodiment of the present invention. The details are omitted in the FIGURE; however, when the inverter control device in the present embodiment is installed in an electric car, the three-phase permanent magnet motor 8 is coupled to the axle of the electric car and operates as the running drive source. Incidentally, the motor control device in the present embodiment is also applicable in vehicles other than electric cars, such as hybrid electric vehicles (HEV), etc.

The inverter control device in the present embodiment is a control device for controlling the operation of the motor 8 and is comprised of a current/voltage map 1, a current controller 2, a coordinate converter 3, a PWM (Pulse Width Modulation) converter 4, a battery 5, an inverter 6, a current sensor 7, a pole position detector 9, a coordinate converter 10, a rotation speed calculation unit 11, an LPF (Low Pass Filter) 12, a voltage detector 13, an abnormality detector 14 and a voltage clamp unit 15.

The current/voltage map 1 is input with the torque command value (T*) that is input from an external source as the output target value of the motor 8, the angular frequency ($\omega$) of motor 8 that is the output of the rotation speed calculation unit 11, and the detection voltage ($V_{dc}$) that is input to the inverter 6 from the battery 5 and is detected by the voltage detector 13. Current/voltage maps 1 are stored with a map for outputting dq axis current command values ($i^*_d$, $i^*_q$) and dq axis non-interference voltage command values ($V^*_{d\_dcpl}$, $V^*_{q\_dcpl}$) with the torque command value (T*), angular frequency ($\omega$), and voltage ($V_{dc}$) as the indexes. This map is made to output the optimal command value for suppressing the loss in the inverter 6 function and loss in the motor 8 function to a minimum in response to the inputs of the torque command value (T*), angular frequency ($\omega$), and voltage ($V_{dc}$). The current/voltage map 1 calculates and outputs dq axis current command values ($i^*_d$, $i^*_q$) and dq axis non-interference voltage command values ($V^*_{d\_dcpl}$, $V^*_{q\_dcpl}$) corresponding to the inputted torque command value (T*), the angular frequency ($\omega$), and the voltage ($V_{dc}$) by referring to the map. Here, the dq axes indicate the components of a rotating coordinate system. To explain the dq axis non-interference voltage command values ($V^*_{d\_dcpl}$, $V^*_{q\_dcpl}$), when current flows to the d-axis and the q-axis, interference voltage of $\omega L_d i_d$ is generated in the d-axis, and $\omega L_q i_q$ is generated in the q-axis. Therefore, dq axis non-interference voltage command values ($V^*_{d\_dcpl}$, $V^*_{q\_dcpl}$) are voltages for negating the interference voltages. Incidentally, $L_d$ indicates the reactance of the d-axis, and $L_q$ indicates the reactance of the q-axis. Also, the current command values ($i^*_d$, $i^*_q$) and the voltage command values ($V^*_{d\_dcpl}$, $V^*_{q\_dcpl}$) pertain to the target values for the alternating current output to the motor 8 from the inverter 6; as will be discussed later, the pulse width of the switching element is determined, and the output power of the inverter 6 is determined based on the command values.

The LPF 12 is input with the dq axis non-interference voltage command values ($V^*_{d\_dcpl}$, $V^*_{q\_dcpl}$), the high frequencies are cut, and the voltage command values ($V^*_{d\_dcpl\_flt}$, $V^*_{q\_dcpl\_flt}$) are output.

The current controller 2 is input with the dq axis current command values ($i^*_d$, $i^*_q$), the voltage command values ($V^*_{d\_dcpl\_flt}$, $V^*_{q\_dcpl\_flt}$), and the dq axis currents ($i_d$, $i_q$); then, the calculation for the current control is carried out, and the dq axis voltage command values ($V^*_d$, $V^*_q$) are output.

The coordinate converter 3 is input with the dq axis voltage command values ($V^*_d$, $V^*_q$) and the detection value θ of the pole position detector 9, and the dq axis voltage command values ($V^*_d$, $V^*_q$) of the rotating coordinate system are converted into the voltage command values ($V^*_u$, $V^*_v$, $V^*_w$) of the u, v, w axes of a clamp coordinate system by employing the following equation 1.

[Equation 1]

$$\begin{bmatrix} v^*_u \\ v^*_v \\ v^*_w \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v^*_d \\ v^*_q \end{bmatrix} \quad (1)$$

The PWM converter 4 generates a control signal of a switching element in the inverter 6 based on the inputted voltage command values ($V^*_u$, $V^*_v$, $V^*_w$) and outputs the control signal to the inverter 6. The switching element carries out switching between ON and OFF based on a PWM signal. The PWM converter 4 converts the voltage command values ($V^*_u$, $V^*_v$, $V^*_w$) into UVW-phase pulse widths ($t_u$, $t_v$, $t_w$) by employing equation 2.

[Equation 2]

$$\begin{cases} t_u = \frac{T_0}{2} \cdot \frac{v^*_u}{v_{dc}} \\ t_v = \frac{T_0}{2} \cdot \frac{v^*_v}{v_{dc}} \\ t_w = \frac{T_0}{2} \cdot \frac{v^*_w}{v_{dc}} \end{cases} \quad (2)$$

However, $T_o$ indicates the PWM carrier period.

The battery 5 is the direct-current power source that includes a secondary battery and is the power source for a car in the present embodiment. The inverter 6 is formed from a three-phase inverter circuit obtained by connecting a plurality of circuits wherein pairs of switching elements (not shown in the FIGURE), such as MOSFET, IGBT, or the like, are connected. Control signals of the pulse widths ($t_u$, $t_v$, $t_w$) are input into the switching elements. Then, the direct-current voltage of the direct-current power supply is converted into alternating-current voltages ($V_u$, $V_v$, $V_w$) by a switching operation of the switching elements and input into the motor 8. Also, when the motor 8 is operated as a generator, the inverter 6 converts the alternating-current voltage output from the motor 8 into direct-current voltage and outputs to the battery 5. As a result, the battery 5 is charged.

The current sensor 7 is provided to the U-phase current and the V-phase current, detects the phase currents ($i_u$, $i_v$), and outputs to the coordinate converter 10. The w-phase current is not detected by the current sensor 7. Instead, the coordinate converter 10 calculates the w-phase current based on the inputted and the compensated phase currents ($i_u$, $i_v$) by employing the following equation 3.

[Equation 3]

$$i_w = -i_u - i_v \quad (3)$$

Incidentally, with regards to the w-phase current, it is possible to provide the current sensor 7 to the w-phase current and carry out the detection with the current sensor 7.

The motor 8 is a multi-phase motor that is connected to the inverter 6. The motor 8 also operates as a generator. The pole position detector 9 is provided to the motor 8. It is a detector for detecting the position of the pole in the motor 8 and outputs the detection value (θ) to the rotation speed calculation unit 11. The rotation speed calculation unit 11 calculates the angular frequency (ω) of the motor 8 from the detection value (θ) of the pole position detector 9.

The coordinate converter 10 is the control unit for carrying out a three-phase/two-phase conversion. The phase currents ($i_u$, $i_v$, $i_w$) and the detection value (θ) of the pole position detector 9 are input into the coordinate converter 10, and the phase currents ($i_u$, $i_v$, $i_w$) of a fixed coordinate system are converted into the phase currents ($i_d$, $i_q$) of a rotating coordinate system by employing the following equation 4.

[Equation 4]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{u\_gain} \\ i_{v\_gain} \\ i_{w\_gain} \end{bmatrix} \quad (4)$$

Then, the inverter control device of the present embodiment carries out a control according to a current control loop of a predetermined gain by the phase currents ($i_d$, $i_q$) being input into the current controller 2.

Next, control in the present embodiment when a failure occurs in the voltage detector 13 will be described. The voltage detector 13 is a sensor for detecting the direct-current power input into the inverter 6 from the battery 5 and outputs the detection voltage to the current/voltage map 1, the PWM converter 4, and the abnormality detector 14. The abnormality detector 14 detects a failure in the voltage detector 14 based on the detection voltage detected by the voltage detector 13 and transmits an abnormality signal indicating an abnormality in the voltage detector 13 to the voltage clamp unit 15 when a failure is detected in the voltage detector 13. Detection of an abnormality in the voltage detector 13 by the abnormality detector 14 is carried out, for example, according to the following method.

The battery 12 is comprised of, for example, a plurality of serially connected battery cells (not shown in the FIGURE) and cell controllers (not shown in the FIGURE) that control the voltage of the battery cells and that are connected to the respective battery cell. The cell controller detects the voltage of the battery cell to which it is connected. By obtaining the sum of the detection voltages of the cell controllers, the voltage of the battery 12 can be calculated. Therefore, the section for detecting the voltage from among the plurality of cell controllers pertains to the voltage detector 13. Then, the detection voltages of the cell controllers are compared in the abnormality detector 14, and an abnormality in the voltage detection performance of the cell controllers can be detected from the results of this comparison. For example, the abnormality detector 14 calculates the average voltage of the detection voltages of the cell controllers and calculates the voltage difference between the average voltage and the detection voltage. The detection voltage of a cell controller with an abnormality has an abnormal voltage value, and the voltage difference from the average value is greater in comparison to the voltage difference of other normal voltage differences. Therefore, an abnormality can be detected from the voltage difference.

The voltage clamp unit 15 clamps the detection voltage ($V_{dc}$) input into the current/voltage map 1 from the voltage detector 13 at the reference voltage ($V_{dc\_l}$) and clamps the detection voltage ($V_{dc}$) input into the PWM converter 4 from the voltage detector 13 at the reference voltage ($V_{dc\_h}$) when an abnormal signal is received from the abnormality detector 14. The reference voltage ($V_{dc\_l}$) is the lowest voltage among the voltage values that the direct-current voltage input into the inverter 6 can take and is a voltage value determined based on the lower limit area for assuring the operation of the inverter 6.

Here, the range of the input voltage that assures the control operation is predetermined in the inverter 6 during the design stage. The range of the input voltage that assures the control operation indicates the performance-assured voltage range regulated by the performance-assured voltage or the operation-assured voltage range regulated by the operation-assured voltage. The performance-assured voltage range is the voltage range that assures performance of the inverter 6 if it is within that voltage range. On the other hand, the operation-assured voltage range is the voltage range that cannot assure the performance of the inverter 6 within that voltage range but can operate the inverter 6 without a failure and indicates a voltage range that is wider than the performance-assured voltage range.

When determining the input voltage range corresponding to the performance-assured voltage range, the reference voltage ($V_{dc\_l}$) is set at the lowest voltage within the performance-assured voltage range. Also, when determining the input voltage range corresponding to the operation-assured voltage range, the reference voltage ($V_{dc\_l}$) is set at the lowest voltage within the operation-assured voltage range. Incidentally, the reference voltage ($V_{dc\_l}$) need not always be a voltage value equal to the lowest voltage value within the performance-assured voltage range or the operation-assured voltage range and can be a voltage value higher than the lowest voltage value. Namely, the reference voltage ($V_{dc\_l}$) should be set based on the lower limit area of the performance-assured voltage range or the operation-assured voltage range.

When determining the input voltage range corresponding to the performance-assured voltage range, the reference voltage ($V_{dc\_h}$) is set at the highest voltage within the performance-assured voltage range. Also, when determining the input voltage range corresponding to the operation-assured voltage range, the reference voltage ($V_{dc\_h}$) is set at the highest voltage within the operation-assured voltage range. Incidentally, the reference voltage ($V_{dc\_h}$) need not always be a voltage value equal to the highest voltage value within the performance-assured voltage range or the operation-assured voltage range and can be a voltage value lower than the highest voltage value. However, the reference voltage ($V_{dc\_h}$) is set at least at a voltage higher than the reference voltage ($V_{dc\_l}$). Namely, the reference voltage ($V_{dc\_h}$) should be set based on the upper limit area of the performance-assured voltage range or the operation-assured voltage range. However, the upper limit range is set at a voltage area that is higher than the aforementioned lower limit area.

The direct-current voltage of the battery 5 is not input as is to the current/voltage map 1; instead, the reference voltage ($V_{dc\_l}$) is input. The voltage/current map 1 calculates dq axis current command values ($i^*_d$, $i^*_q$) and dq axis non-interference voltage command values ($V^*_{d\_dcpl}$, $V^*_{q\_dcpl}$) based on the reference voltage ($V_{dc\_l}$) by referring to a stored map. Consequently, the voltage input into the current/voltage map 1 is a reference voltage ($V_{dc\_l}$) that is lower than the direct-current voltage of the battery 5 when an abnormality is generated in the voltage detector 13. Therefore, the voltage/current map 1 does not output a command voltage by referencing a voltage greater than the actual voltage of the battery 5 and can prevent a power shortage in the inverter 6.

Also, the direct-current voltage of the battery 5 is not input as is into the PWM converter 4; instead, the reference voltage ($V_{dc\_h}$) is input. The PWM converter 4 determines the pulse width of the control signal of the inverter 6 based on the reference voltage ($V_{dc\_h}$). In the aforementioned equation 2, the voltage ($V_{dc}$) input to the PWM converter 4 is in the denominator position. Therefore, variation in the pulse widths (tu, tv, tw) is great in relation to the variation in voltage command values ($V^*_u$, $V^*_v$, $V^*_w$) when the denominator is set at a small value. The variation of the pulse widths ($t_u$, $t_v$, $t_w$) is at its greatest when the voltage input into the PWM converter 4 is clamped at the lowest voltage within the assured voltage range.

When an abnormality is detected in the voltage detector 13, the PWM converter 4 determines the pulse width by using the reference voltage ($V_{dc\_h}$), which is a voltage higher than the reference voltage ($V_{dc\_l}$), as the input voltage. As a result, the pulse width of the control signal ceases to vary greatly, and frequently, a state of low loop gain results and stability in the control can be achieved.

For example, when the assured voltage range of the inverter 6 is 200 to −400V and the input voltage to the PWM converter 4 is clamped at the upper limit value (400V) of the assured voltage range, the stability in the control indicated by the variation in the pulse width in relation to the voltage command values ($V^*_u$, $V^*_v$, $V^*_s$) of a given predetermined range improves by about double in comparison to when the input voltage to the PWM converter 4 is clamped at the lower limit value (200V) of the assured voltage range.

As previously described, the present embodiment clamps the detection voltage ($V_{dc}$) input into current/voltage map 1 at the reference voltage ($V_{dc\_l}$) and the detection voltage ($V_{dc}$) input into the PWM converter 4 at the reference voltage ($V_{dc\_h}$), which is a voltage higher than the reference voltage ($V_{dc\_l}$) with the voltage clamp unit 15 when the abnormality detector 14 detects an abnormality in the voltage direction unit 13. As a result, the current/voltage map 1 does not calculate the command value by referencing a voltage greater than the actual voltage of the battery 5, and power shortage in the inverter 6 can be avoided. Also, variation in the pulse width of a control signal generated by the PWM converter 4 can be suppressed. Therefore, it is possible to prevent a state of high loop gain, a large gain margin can be achieved, and as a result, the control stability can be improved.

Additionally, when it is necessary to expand the operating range for the inverter 6 and enhance the response for current control in the inverter control device of the present embodiment, the circuit for the inverter control device in the present embodiment is designed for the loop gain to be high and the gain margin to be small to enhance the response. Also, there is no margin in the direct-current voltage of the battery 5 for the output voltage of the inverter 6, and the inverter control device of the present embodiment operates at a high modulation rate. As previously described, the present embodiment can make the gain margin large while avoiding a power shortage in the inverter 6 when the abnormality detector 14 detects an abnormality in the power detector 13. Therefore, even when the circuit is designed to accommodate expansion in the operating range of the inverter 6 and enhance the response for current control, control instability can be prevented when there is an abnormality in the voltage detector 13.

Also, the present embodiment clamps the detection voltage ($V_{dc}$) input into the PWM converter 4 at the reference voltage ($V_{dc\_h}$) that is determined based on the upper limit area of the assured voltage range of the inverter 6 with the voltage clamp unit 15 when the abnormality detector 14 detects an abnormality in the voltage detector 13. Therefore, variation in the pulse width of a control signal generated by the PWM converter 4 can be suppressed, a state of high loop gain can be prevented, and the gain margin can be made large. As a result, the control stability can be improved.

Incidentally, the reference voltage ($V_{dc\_1}$) in the present embodiment corresponds to the lower limit voltage of the performance-assured voltage or the lower limit voltage of the operation-assured voltage, and the reference voltage ($V_{dc\_h}$) corresponds to the upper limit voltage of the performance-assured voltage or the upper limit voltage of the operation-assured voltage. Also, the present embodiment can set the reference voltage ($V_{dc\_1}$) to correspond with a voltage below the lower limit voltage of the performance-assured voltage and a voltage above the lower limit voltage of the operation-assured voltage; the reference voltage ($V_{dc\_h}$) can be set to correspond with a voltage above the upper limit voltage of the performance-assured voltage and below the upper limit voltage of the operation-assured voltage. The v current/voltage map 1 corresponds to "the target value calculation section," while the current controller 2, the coordinate converter 3, and the PWM converter 4 corresponds to "the inverter control section." Additionally, the reference voltage ($V_{dc\_1}$) in the present embodiment corresponds to "the first assured voltage", and the reference voltage ($V_{dc\_h}$) corresponds to "the second assured voltage".

The invention claimed is:

1. An inverter control device comprising:
   a voltage detector configured to detect a direct-current voltage of an inverter that converts a direct-current power input from a direct-current power supply into an alternating-current power;
   a target value calculation section configured to calculate a target value of an alternating-current output from the inverter based on a detection voltage detected by the voltage detector;
   an inverter control section configured to generate a control signal for a switching element of the inverter based on the detection voltage and the target value to control the inverter;
   an abnormality detector configured to detect an occurrence of an abnormality in the voltage detector; and
   a voltage clamp unit configured to clamp the detection voltage, for calculating the target value by the target value calculation section, at a first assured voltage determined based on a lower limit area of an assured voltage range that assures an operation of the inverter; and clamps the detection voltage, for generating the control signal by the inverter control section, at a second assured voltage that is higher than the first assured voltage, upon detecting the abnormality in the voltage detector by the abnormality detector.

2. The inverter control device as described in claim 1, wherein
   the second assured voltage being determined based on an upper limit area of an assured voltage range that assures the operation of the inverter.

3. An inverter control method comprising:
   detecting a direct-current voltage of a direct-current power supply input to an inverter with a voltage detector;
   calculating a target value of an alternating-current output from an inverter based on a detection voltage of the direct-current power supply that was detected;
   generating a control signal for a switching element of the inverter based on the detection voltage and the target value;
   converting a direct-current power of the direct-current power supply into alternating-current power by controlling an ON and OFF operation of the switching element based on the control signal;
   detecting an occurrence of an abnormality in the voltage detector; and
   clamping the detection voltage, for calculating the target value, at a first assured voltage determined based on a lower limit area of an assured voltage range that assures an operation of the inverter; and clamping the detection voltage, for generating the control signal, at second assured voltage that is higher than the first assured voltage, upon detecting the abnormality in the voltage detector.

* * * * *